(12) United States Patent
Hirokane et al.

(10) Patent No.: US 6,456,571 B1
(45) Date of Patent: Sep. 24, 2002

(54) MAGNETO-OPTICAL RECORDING MEDIUM AND REPRODUCING METHOD THEREOF

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/541,093

(22) Filed: Mar. 31, 2000

(30) Foreign Application Priority Data

Mar. 31, 1999 (JP) .......................................... 11-090527

(51) Int. Cl.$^7$ .............................................. G11B 11/00
(52) U.S. Cl. ................. 369/13.43; 369/13.42; 428/694 MM
(58) Field of Search ..................... 369/13, 14; 360/59, 360/114; 428/64.3, 64.1, 694 ML, 694 MM (56) References Cited

U.S. PATENT DOCUMENTS 5,982,715 A * 11/1999 Mori et al. .................... 369/13

6,187,460 B1 * 2/2001 Nishimura ..................... 369/13
6,400,565 B1 * 6/2002 Tanase et al. ............. 369/13.43

FOREIGN PATENT DOCUMENTS

JP          9-320134          12/1997

* cited by examiner

*Primary Examiner*—Tan Dinh
(74) *Attorney, Agent, or Firm*—Dike, Bronstein, Roberts & Cushman, Intellectual Property Practice Group of Edwards & Angell, LLP; David G. Conlin, Esq.; George W. Hartnell, Esq.

(57) ABSTRACT

A magneto-optical recording medium comprising a recording magnetic layer made of a perpendicularly magnetized film and a multilayer reproducing film, wherein the multilayer reproducing film has two reproducing magnetic layers which are in a in-plane magnetized state at room temperature and shift to a perpendicularly magnetized state with a rise in temperature and an in-panel magnetized layer disposed between the two reproducing magnetic layers, which is in an in-plane magnetized state from room temperature to a Curie temperature and has a lower Curie temperature than the recording magnetic layer and the reproducing magnetic layers.

13 Claims, 4 Drawing Sheets

TOTAL MAGNETIZATION    LEAKED MAGNETIC FLUX

FIG. 1

↑ TOTAL MAGNETIZATION ⇧ LEAKED MAGNETIC FLUX

↑ TOTAL MAGNETIZATION   ⇧ LEAKED MAGNETIC FLUX

↑ TOTAL MAGNETIZATION   ⇧ LEAKED MAGNETIC FLUX

↑ TOTAL MAGNETIZATION   ⇧ LEAKED MAGNETIC FLUX

MAGNETO-OPTICAL RECORDING MEDIUM AND REPRODUCING METHOD THEREOF

CROSS-REFERENCES TO RELATED APPLICATIONS

This application is related to Japanese patent application No. HEI 11(1999)-090527 filed on Mar. 31, 1999 whose priority is claimed under 35 USC §119, the disclosure of which is incorporated herein by reference in its entirety.

FIELD OF THE INVENTION

The present invention relates to a magneto-optical recording medium such as a magneto-optical disk, a magneto-optical tape, a magneto-optical card, etc., applied to a magneto-optical recording and reproducing apparatus and to a reproducing method thereof.

BACKGROUND OF THE INVENTION

Hitherto, as a re-writable optical recording medium, a magneto-optical disk using a magneto-optical recording medium has been practically used. In such a magneto-optical disk, by focusing and striking a light beam emitted from a semiconductor laser onto the optical recording medium, the local temperature of the magneto-optical recording medium is raised, whereby recording and erasing are carried out. Also, a light beam of an intensity of not causing recording and erasing is focused and strikes onto a magneto-optical recording medium and by discriminating the polarized light state of the reflected light, the reproduction of the recorded information is carried out. However, in the magneto-optical recording medium of prior art, there is a problem that when the recording bit diameter and the recording bit distance in the recorded magnetic domain become small relative to the beam spot diameter of the light beam, the reproduction characteristics are deteriorated. This is because an adjacent recording bit enters the beam spot of a light beam focused onto the aimed recording bit, it becomes impossible to separate each recording bit and reproduce it.

As a magneto-optical recording medium for solving the above-described problem, a magneto-optical recording medium composed of a reproducing magnetic layer which is in an in-plane magnetized state at room temperature and becomes a perpendicularly magnetized state at a temperature of at least a critical temperature, an in-plane magnetized layer having a Curie temperature near the above-described critical temperature, a non-magnetic intermediate layer, and a recording layer made of a perpendicularly magnetized film and recording an information is proposed (Japanese Patent Laid-Open No. 320134/1997).

However, in the magneto-optical recording medium described above, because the reproducing magnetic layer is in an in-plane magnetized state in the temperature range of lower than the critical temperature, the information of the recording magnetic domain recorded to the recording layer is not transferred to the reproducing magnetic layer and the information of the recording magnetic domain is not reproduced. On the other hand, in the temperature range of at least the critical temperature, the reproducing magnetic layer becomes a perpendicularly magnetized state, the information of the recording magnetic domain recorded to the recording layer is transferred to the reproducing magnetic layer, and the information of the recording magnetic domain is reproduced. Accordingly, even when an adjacent recording bit enters the beam spot of a light beam focused onto the reproducing magnetic layer, the reproducing power of a light beam and the critical temperature at which the reproducing magnetic layer becomes a perpendicularly magnetized state are appropriately established, each recording bit can be separated and reproduced, and an information recorded at a high density can be reproduced.

However, recently, a larger recording capacity has been required for an optical disk but in the magneto-optical recording medium described in Japanese Patent Laid-Open No. 320134/1997 described above, there is a problem that the reproduction resolving power is insufficient.

SUMMARY OF THE INVENTION

The present invention has been made for solving the above-described problem and provides a magneto-optical recording medium which can obtain a high reproduction resolving power, can prevent the occurrence of lowering the reproduced amount of light, and can obtain a reproduced signal of a high quality, and also provides a reproduction method thereof.

That is, according to one aspect of the invention, there is provided a magneto-optical recording medium comprising a recording magnetic layer made of a perpendicularly magnetized film and a multilayer reproducing film, wherein the multilayer reproducing film has two reproducing magnetic layers which are in a in-plane magnetized state at room temperature and shift to a perpendicularly magnetized state with a rise in temperature and an in-plane magnetized layer disposed between the two reproducing magnetic layers, which is in an in-plane magnetized state from room temperature to a Curie temperature and has a lower Curie temperature than the recording magnetic layer and the reproducing magnetic layers.

That is, in the magneto-optical recording medium, the shift of the reproducing magnetic layers from the in-plane magnetized state to the perpendicularly magnetized state becomes more sharp than a magneto-optical recording medium of prior art. Thereby, the limit of the improvement of the reproduction resolving power of prior art is overcome and a higher reproduction resolving power is obtained.

In the magneto-optical recording medium of the invention, it is preferred that the critical temperature of each reproducing magnetic layer for shifting to the perpendicularly magnetized state is established to be almost the same as the Curie temperature of the in-plane magnetized layer adjacent to at least one side of the film thickness direction. In this case, the term "almost the same" means a range of within ±30° C.

Also, in the magneto-optical recording medium of the aspect of this invention, it is preferred that the thickness of each of the reproducing magnetic layers is from 10 nm to 35 nm.

This is because when the thickness thereof is less than 10 nm, the intensity of the reproduction signal is considerably lowered, while the thickness thereof is more than 35 nm, the reproduction resolving power is lowered.

Furthermore, in the magneto-optical recording medium of the aspect of the invention, it is preferred that the in-plane magnetized layer disposed between the reproducing magnetic layers is established to have a thin thickness capable of transmitting a light beam for reproduction through the layer. In this case, it is preferred that the thickness of the in-plane magnetized layer is from 3 nm to 30 nm as described below.

Also, according to another aspect of the invention, there is provided a magneto-optical recording medium comprising a recording magnetic layer made of a perpendicularly magnetized film and a multilayer reproducing film, wherein the multilayer reproducing film comprises at least two reproducing magnetic layers which are in an in-plane magnetized state at room temperature and shift to a perpendicularly magnetized state with a rise in temperature, and an in-plane magnetized layer having a lower Curie temperature than the recording magnetic layer and the reproducing magnetic layers, which is in an in-plane magnetized state from room temperature to the Curie temperature, the reproducing magnetic layers and the in-plane magnetized layer being alternately laminated.

According to another aspect of the invention, there is provided a method of reproducing a magneto-optical recording medium, which comprises using one of the above-described magneto-optical recording medium, irradiating the above-described multilayer reproducing film by a light from the opposite side to the side disposed the recording magnetic layer and reproducing an information using not only the reflected light from the reproducing magnetic layer disposed nearest the light incident side but also the reflected light of the light transmitted through the reproducing magnetic layer and striking the other reproducing magnetic layer.

DETAILED DESCRIPTION OF THE INVENTION

Then, an embodiment of the invention is described in detail by referring to the drawings.

Figure 1:
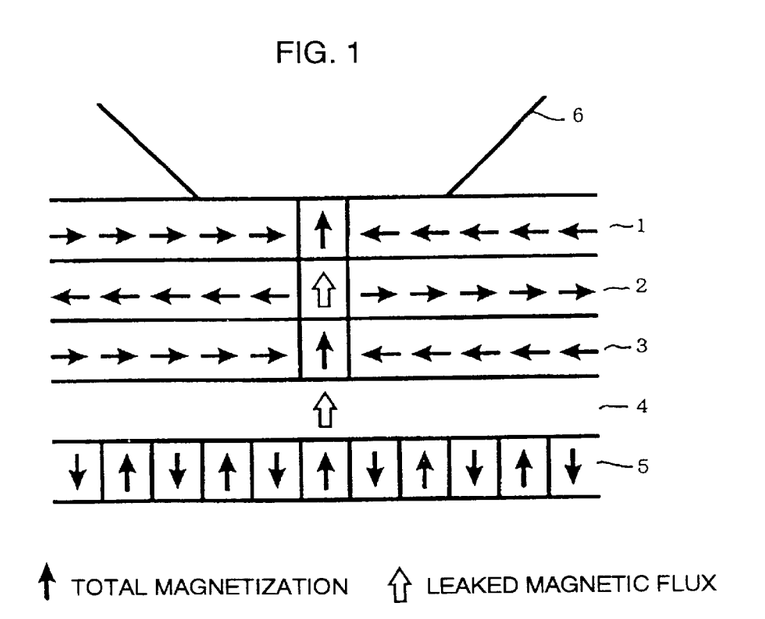
FIG. 1 is a schematic cross-sectional view explaining the reproduction principle of the magneto-optical disk of the invention.
Figure 8:
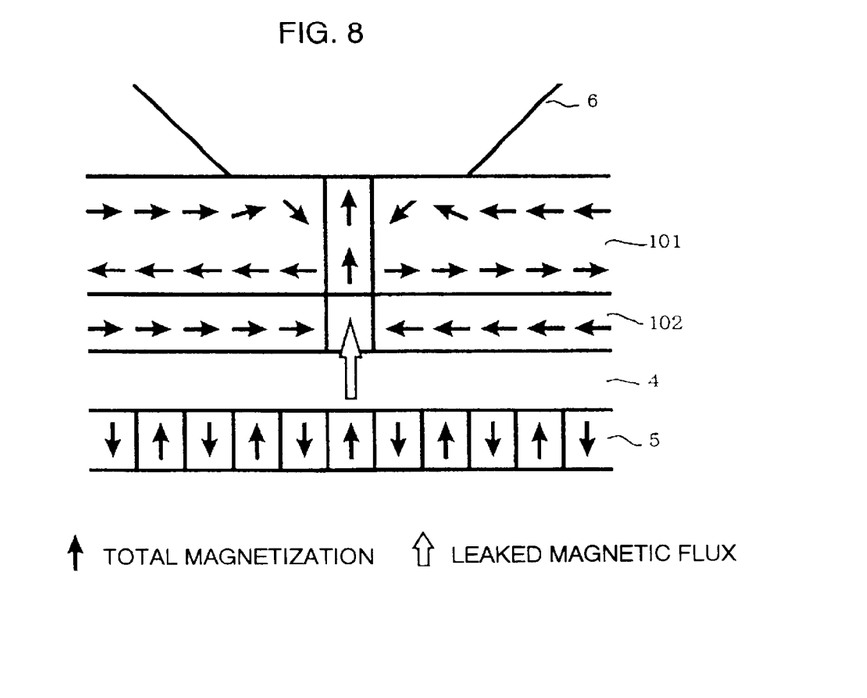
FIG. 8 is a schematic cross-sectional view explaining the reproduction principle of a magneto-optical disk of prior art.

First, the reproduction performance principle of a magneto-optical recording medium is explained. FIG. 1 is a cross-sectional view explaining the super-resolving reproduction performance principle of the magneto-optical recording medium of the invention and FIG. 8 is a cross-sectional view explaining the super-resolving reproduction performance principle of the magneto-optical recording medium of prior art (Japanese Patent Laid-Open No. 320134/1997).

First, the super-resolving reproduction performance principle of prior art is explained. As shown in FIG. 8, the super-resolving reproduction performance principle of prior art has the construction wherein a reproducing magnetic layer 101 made of a rare earth metal-transition metal alloy, which is in an in-plane magnetized state at room temperature and becomes in a perpendicularly magnetized state at a temperature of at least a critical temperature, an in-plane magnetized layer 102 having a Curie temperature near the critical temperature, which is in an in-plane magnetized state from room temperature to the Curie temperature, a non-magnetic intermediate layer 4, and a recording magnetic layer 5 made of a rare earth metal-transition metal alloy having a compensation temperature at room temperature, are successively laminated.

The reproduction is carried out by focusing and irradiating a light beam 6 from the reproducing magnetic layer 101 side. When the light beam 6 is irradiated, a temperature distribution of a Gaussian distribution state corresponding to the intensity distribution of the light beam 6 is formed on the medium. The reproducing magnetic layer 101 is gradually shifts from the in-plane magnetized state to a perpendicular magnetized state with the distribution of temperature and becomes the perpendicularly magnetized state at a temperature of at least a certain critical temperature. In this case, because the in-plane magnetized layer 102 is an in-plane magnetized film having a Curie temperature near the critical temperature, by exchange-bonding the reproducing magnetic layer 101 and the in-plane magnetized layer 102 at a temperature lower than the critical temperature, the exchange-bonding force of making an in-plane magnetized state acts to the magnetization of the reproducing magnetic layer 101 in a temperature state of lower than the critical temperature.

By this action, the transition from the in-plane magnetized state to the perpendicularly magnetized state in the reproducing magnetic layer 101 with the increase of the temperature can be made sharp, the magnetized information only in the domain where the temperature has been raised with the irradiation of the light beam of the recording magnetic layer 5 is transferred to the reproducing magnetic layer 101 by static magnetic bonding and can be reproduced by the light beam 6. In this case, the non-magnetic intermediate layer 4 is formed for the purpose of realizing stable static magnetic bonding of the recording magnetic layer 5 and the reproducing magnetic layer 101, and the in-plane magnetized layer 102.

As described above, in the reproduction of the magneto-optical recording medium, it is desirable that the information only in the temperature range of at least the critical temperature, wherein the reproducing magnetic layer 101 becomes a perpendicularly magnetized state, is transferred and reproduced. However, as shown in FIG. 8, with regard to the portion of the generating magnetic layer 101 adjacent to the in-plane magnetized layer 102, the transition from the in-plane magnetized state to a perpendicularly magnetized state in the reproducing magnetic layer 101 with a rise in temperature can be made sharp because exchange-bonding from the in-plane magnetized layer 102 effectively functions, and on the other hand, as the reproducing magnetic layer 101 becomes apart from the in-plane magnetized layer 102, the exchange-bonding effect of the in-plane magnetized layer 102 is vanished and the characteristics intrinsic to the reproducing magnetic layer 101, that is, the characteristics of gradually changing from the in-plane magnetized state to the perpendicularly magnetized state with a rise in temperature appear. Accordingly, in the incident side of a light beam 6 of the reproducing magnetic layer 101, a magnetization having a perpendicularly magnetized component contributing to the reproduction exists in the temperature range of lower than the critical temperature, whereby the reproduction resolving power is deteriorated.

From the above description, it can be seen that for improving the reproduction resolving power, it is necessary to maintain a stable in-plane magnetized state in the temperature range of lower than the critical temperature at the incident side of a light beam 6 by thinning the film thickness of the reproducing magnetic layer 101, that is, to maintain the shift from the in-plane magnetization to the perpendicularly magnetized state in the reproducing magnetic layer 101 sharp.

However, when the thickness of the reproducing magnetic layer 101 is thinned, the amount of light reflected at the reproducing magnetic layer 101 becomes less and also the Kerr rotation angle caused by the reproducing magnetic layer 101 becomes small, which results in lowering the reproduction signal output. Furthermore,. it has newly been confirmed that the amount of light of the light beam 6 transmitted through the reproducing magnetic layer 101 and the in-plane magnetized layer 102 and directly reproduce the magnetized information recorded to the recording magnetic layer 5 becomes large and conversely, the reproduction resolving power is reduced.

As described above, it has been found that in the magneto-optical recording medium of prior art shown in FIG. 8, there is a limit in the improvement of the reproduction resolving power by thinning the thickness of the reproducing magnetic layer 101.

The present invention relates to a super-resolving magneto-optical recording medium which overcomes the problem of the limitation of the reproduction resolving power improvement described above by making the shift of the reproducing magnetic layer from the in-plane magnetized state to the perpendicularly magnetized state sharper, and is capable of obtaining a higher reproduction resolving power.

To be specific, the super-resolving magneto-optically recording medium of the invention has a construction wherein a reproducing magnetic layer which is in an in-plane magnetized state at room temperature and shifts to a perpendicularly magnetized state with a rise in temperature and an in-plane magnetized layer which is in an in-plane magnetized state from room temperature to a Curie temperature and has the Curie temperature lower than a recording magnetic layer and the reproducing magnetic layer are alternately laminated, and including at least a multilayer reproducing film having at least two reproducing magnetic layers and the recording magnetic layer for recording an information.

FIG. 1 is a cross-sectional view explaining the reproduction performance principle of the super-resolving magneto-optical recording medium of the invention.

In this case, as an embodiment of the magneto-optical recording medium of the invention, a magneto-optical recording medium wherein a first reproducing magnetic layer 1, a first in-plane magnetized layer 2, a second reproducing magnetic layer 3, a non-magnetic intermediate layer 4, and a recording magnetic layer 5 are successively laminated is explained. In addition, in the embodiment shown in FIG. 1, the multilayer reproducing film of the invention mentioned above is constructed by the first reproducing magnetic layer 1, the first in-plane magnetized layer 2, and the second reproducing magnetic layer 3.

Each of the first reproducing magnetic layer 1 and the second reproducing magnetic layer 3 is in a in-plane magnetized state at room temperature as the reproducing magnetic layer 101 of prior art shown in FIG. 8 and is a magnetic film made of a rare earth metal-transition metal alloy, which becomes a perpendicularly magnetized state at a temperature of at least the critical temperature. Also, the first in-plane magnetized layer 2 is in an in-plane magnetized state from room temperature to the Curie temperature as in the case of the in-plane magnetized layer 102 of prior art shown in FIG. 8, and is an in-plane magnetized film having the Curie temperature near the critical temperature.

According to the above-described magneto-optical recording medium of the invention, the reproduction resolving power can be improved by thinning the thicknesses of the first reproducing magnetic layer 1 and the second reproducing magnetic layer 3. That is, by thinning the thicknesses of the first reproducing magnetic layer 1 and the second reproducing magnetic layer 3, exchange-bonding from the first in-plane magnetized layer 2 effectively functions to the first reproducing magnetic layer 1 and the second reproducing magnetic layer 3 of the portions adjacent to the first in-plane magnetized layer 2 and the shift from the in-plane magnetized state to a perpendicularly magnetized state in the first reproducing magnetic layer 1 and the second reproducing magnetic layer 3 with a rise in temperature can be made sharp.

Furthermore, by setting the thickness of the first in-plane magnetized layer 2 to a thickness capable of transmitting therethrough the light beams 6, the light beam 6 transmitted through the first reproducing magnetic layer 1 and the first in-plane magnetized layer 2 is reflected at the second reproducing magnetic layer 3, the reproducing signal can be detected by using the light beam reflected from the first reproducing magnetic layer and the second reproducing magnetic layer 3, and also, a decrease of the Kerr rotation angle, that is, lowering of the reproducing signal output caused by thinning the thicknesses of the first reproducing magnetic layer 1 and the second reproducing magnetic layer 3 can be restrained.

Also, by thickening the total thickness of the first reproducing magnetic layer 1, the first in-plane magnetized layer 2, and the second reproducing magnetic layer 3, the amount of light of the light beam 6 transmitted through the first reproducing magnetic layer 1, the first in-plane magnetized layer 2, and the second reproducing magnetic layer 3 can be restrained, and the amount of light of the light beam 6 directly reproducing the magnetized information recorded to the recording magnetic layer 5 can be restrained.

The following examples are intended to illustrate the present invention specifically but not to limit the invention in any way.

EXAMPLE 1

Example 1 of the invention is described as follows based on the drawings. In addition, in Example 1, the case of applying the magneto-optical recording medium of the invention to a magneto-optical disk is explained.

Figure 2:
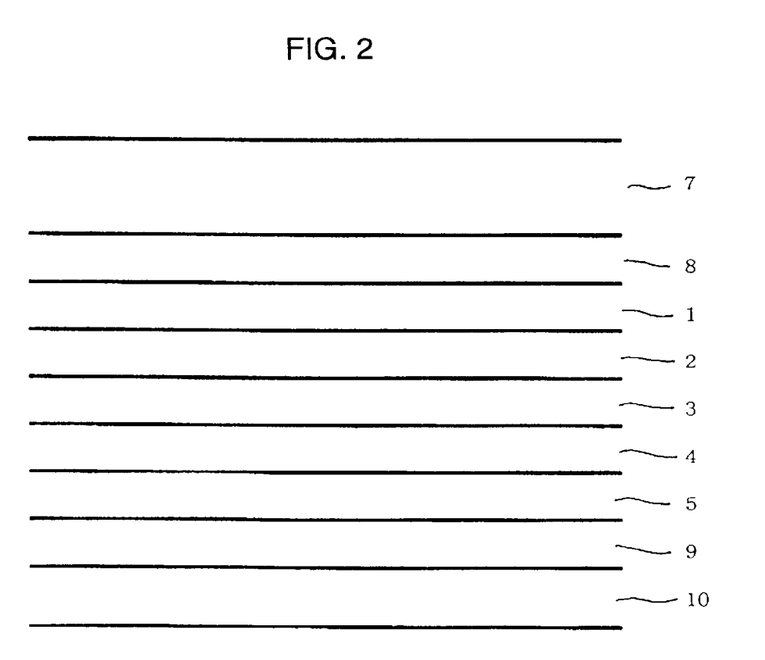
FIG. 2 is a cross-sectional view showing the construction of the magneto-optical disk of Example 1.

FIG. 2 is a cross-sectional view showing the construction of the magneto-optical disk. The magneto-optical disk has a disk main body wherein a substrate 7, a transparent dielectric layer 8, a first reproducing magnetic layer 1, a first in-plane magnetized layer 2, a second reproducing magnetic layer 3, a non-magnetic intermediate layer 4, a recording magnetic layer 5, a protective layer 9, and an overcoat layer 10 are laminated in this order.

In such a magneto-optical disk, the Curie temperature recording system is used as a recording system, wherein a light beam 6 emitted from a semiconductor laser is focused onto the first reproducing magnetic layer 1 by an objective lens, whereby an information is recorded and reproduced by a magneto-optic effect which is known as a polar Kerr effect. The above-described polar Kerr effect is a phenomenon that the direction of the rotation of the plane of polarization of a reflected light is reversed by the direction of the magnetization perpendicular to the plane of incidence.

The substrate 7 is made of a transparent base material such as polycarbonate, etc., and is formed in a disk form.

It is desirable that the transparent dielectric layer 8 is constituted of a material containing no oxygen, such as AlN, SiN, AlSiN, etc., and it is necessary that the thickness of the layer is established so that a good is interference effect is realized to the incident laser light and the Kerr rotation angle of the medium is increased, and when the wavelength of the reproduced light is 80 and the refractive index of the transparent dielectric layer 8 is n, the thickness of the transparent dielectric layer 8 is established to be about ($\lambda/4n$). For example, when the wavelength of a laser light is 680 nm, the thickness of the transparent dielectric layer 8 may be established to be from about 40 nm to 100 nm.

The first reproducing magnetic layer 1 is a magnetic film made of a rare earth metal-transition metal alloy and the magnetic characteristics are composition-controlled such that the layer is in an in-plane magnetized state at room temperature and becomes a perpendicularly magnetized state at a temperature of at least a certain critical temperature with a rise in temperature.

It is desirable that the critical temperature of the first reproducing magnetic layer 1 is from 100° C. to 200° C. When the critical temperature is lower than 100° C., the first reproducing magnetic layer 1 becomes in a perpendicularly magnetized state by a slight rise in temperature, whereby stable reproducing characteristics cannot be obtained to the change of an environmental temperature. Also, when the critical temperature is higher than 200° C., the critical temperature comes close to the Curie temperature of the recording magnetic layer 5, whereby a reproduction laser power margin is hard to be ensured.

It is desirable that the thickness of the first reproducing magnetic layer 1 is from 10 nm to 35 nm. By thinning the thickness of the first reproducing magnetic layer 1, a higher reproduction resolving power can be obtained but when the thickness is less than 10 nm, the reflected light from the first reproducing magnetic layer 1 is reduced, whereby the intensity of the reproduction signal is considerably lowered. Also, when the thickness is more than 35 nm, the thickness of the first reproducing magnetic layer 1 becomes relatively too thick to the thickness of the in-plane magnetized layer 2, whereby the reproduction resolving power is lowered.

The first in-plane magnetized layer 2 is a magnetic layer made of a rare earth metal-transition metal alloy or a magnetic film made of an alloy of a transition metal and a non-magnetic element, and is an in-plane magnetized film having a magnetization in the direction parallel to the film surface. As described above, the first in-plane magnetized layer 2 is formed for maintaining the in-plane magnetized state of the first reproducing magnetic layer 1 and the second reproducing magnetic layer 2 by exchange-bonding with the first reproducing magnetic layer 1 and the second reproducing magnetic layer 3 at a temperature lower than the above-described critical temperature, and for strengthening the in-plane magnetized mask.

It is desirable that the Curie temperature of the first in-plane magnetized layer 2 is established to be almost the same as the critical temperatures of the first reproducing magnetic layer 1 and the second reproducing magnetic layer 3, and it is also desirable that the difference of the Curie temperature and the critical temperatures described above is established to be in the range of within ±30° C.

It is desirable that the thickness of the first in-plane magnetized is layer 2 is from 3 nm to 30 nm. When the thickness of the first in-plane magnetized layer 2 is less than 3 nm, the thickness becomes too small relative to the thickness of the first reproducing magnetic layer 1 and the second reproducing magnetic layer 3 and the force of strengthening the in-plane magnetized masks of the first reproducing magnetic layer 1 and the second reproducing magnetic layer 3 becomes weak, whereby the reproduction resolving power is deteriorated. Also, the thickness of the first in-plane magnetized layer 2 is more than 30 nm, the amount of the light beam 6 transmitted through the first in-plane magnetized layer 2 decreases, whereby the reflected light from the second reproducing magnetic layer 3 cannot be detected as a reproduction signal and the intensity of the reproduction signal is lowered.

The second reproducing magnetic layer 3 is a magnetic film made of a rare earth metal-transition metal alloy and having the same magnetic characteristics as those of the first reproducing magnetic layer, and the magnetic characteristics are composition-controlled so that the layer is in an in-plane magnetized state at room temperature and shifts to a perpendicularly magnetized state with a rise in temperature.

In this case, in the second reproducing magnetic layer 3, as is the case of the first reproducing magnetic layer 1, by exchange-bonding with the first in-plane magnetized layer 2, the in-plane magnetized state of the second reproducing magnetic layer 3 is maintained at a temperature of lower than the above-described critical temperature and the in-plane magnetized mask is strengthened.

It is desirable that the critical temperature at which the second reproducing magnetic layer 3 shifts from the in-plane magnetization to a perpendicular magnetization is from 100° C. to 200° C. When the critical temperature is lower than 100° C., the second reproducing magnetic layer 3 becomes the perpendicularly magnetized state by a slight rise in temperature, whereby stable reproduction characteristics against a change in the environmental temperature cannot be obtained. Also, when the critical temperature is higher than 200° C., the critical temperature comes close to the Curie temperature of the recording magnetic layer 5, whereby the reproducing laser power margin is hard to be ensured. Also, it is desirable that the critical temperature of the second reproducing magnetic layer 3 is established to be almost the same temperature as the Curie temperature of the first in-plane magnetized layer 2 (the difference from the Curie temperature being in the range of within ±30° C.).

Also, it is desirable that the thickness of the second reproducing magnetic layer 3 is from 10 nm to 35 nm. By thinning the thickness of the second reproducing magnetic layer 3, a higher reproduction resolving power can be obtained but when the thickness thereof is less than 10 nm, the amount of the reflected light from the second reproducing magnetic layer 3 is reduced, whereby the intensity of the reproduction signal is considerably lowered. Also, when the thickness is more than 35 nm, the thickness of the second reproducing magnetic layer 3 becomes too thick relative to the thickness of the first in-plane magnetized layer 2, whereby the reproduction resolving power is lowered.

The non-magnetic intermediate layer 4 is made of a dielectric such as AlN, SiN, AlSiN, etc., or an alloy of non-magnetic metals such as Al, Ti, Ta, etc., and the thickness of the non-magnetic intermediate layer 4 is established to be from 0.5 nm to 40 nm such that the first reproducing magnetic layer 1 and the first in-plane magnetized layer 2 or the second reproducing magnetic layer 3 and the recording magnetic layer 5 causes static magnetic bonding. When the thickness of the non-magnetic intermediate layer 4 is less than 0.5 nm, the non-magnetic intermediate layer 4 is not continuously formed and a stable static bonding state cannot be maintained. Also, when the thickness of the non-magnetic intermediate layer 4 is more than 40 nm, the distance between the recording magnetic layer 5 and the second reproducing magnetic layer 3 increases and the stable static bonding state cannot be maintained.

The recording magnetic layer 5 is composed of a perpendicularly magnetized film made of a rare earth metal-transition metal alloy and the thickness of the recording magnetic layer 5 is established to be in the range of from 20 nm to 80 nm. When the thickness of the recording magnetic layer 5 is less than 20 nm, a leaked magnetic flux generated from the recording magnetic layer 5 becomes small, whereby the stable static magnetic bonding state cannot be maintained. Also, when the thickness of the recording magnetic layer 5 is more than 80 nm, the deterioration of the recording sensitivity caused by an increase in the thickness becomes severe.

The protective layer 9 is made of a dielectric such as AlN, SiN, AlSiN, etc., or an alloy of non-magnetic metals such as Al, Ti, Ta, etc., and is formed for the purpose of preventing the oxidation of the rare earth metal-transition metal alloy used for the first reproducing magnetic layer 1, the first in-plane magnetized layer 2, the second in-plane magnetized layer 3, and the recording magnetic layer 4, and the thickness of the protective layer 9 is established to be in the range of from 5 nm to 60 nm.

The overcoat layer 10 is formed by coating a ultraviolet curing resin or a thermosetting resin by spin coating and by irradiating the coated layer with ultraviolet rays or by heating the coated layer.

Then, specific examples of the formation method of the magneto-optical disk having the above-described construction and the recording and reproduction characteristics are explained.

(1) Formation method of the magneto-optical disk:

The formation method of the magneto-optical disk having the above-described construction is explained.

On a substrate holder in a sputtering apparatus equipped with each of an Al target, a GdFeCo alloy target, a GdFe alloy target, and a TbFeCo alloy target was placed a disk-form polycarbonate-made substrate 7 having formed thereon a land recording region having a 0.6 $\mu$m width and a groove recording region capable of land/groove recording.

Also, after evacuating the inside of the sputtering apparatus to $1\times10^{-6}$ Torr, a mixed gas of argon and nitrogen was introduced into the apparatus, an electric power was supplied to the Al target, and a gas pressure of $4\times10^{-3}$ Torr, a transparent dielectric layer 8 made of AlN was formed on the substrate 7 at a thickness of 60 nm.

Then, after evacuating the inside of the sputtering apparatus to $1\times10^{-6}$ Torr again, an argon gas was introduced into the apparatus, an electric power was supplied to the GdFeCo alloy target, and at a gas pressure of $4\times10^{-3}$ Torr, a first reproducing magnetic layer 1 made of $Gd_{0.31}(Fe_{0.80}Co_{0.20})_{0.69}$ was formed on the transparent dielectric layer 8 at a thickness of 15 nm. The first reproducing magnetic layer 1 had the characteristics of being in an in-plane magnetized state at room temperature and becoming a perpendicularly magnetized state at a temperature of 150° C., the compensation temperature thereof was 300° C., and the Curie temperature thereof was 320° C.

Then, an electric power was supplied to the GdFe alloy target and at a gas pressure of $4\times10^{-3}$ Torr, a first in-plane magnetized layer 2 made of $Gd_{0.12}Fe_{0.88}$ was formed on the above-described first reproducing magnetic layer 1 at a thickness of 10 nm. The first in-plane magnetized layer 2 was an in-plane magnetized film having a Curie temperature of 150° C. and having a magnetization in the direction parallel to the film surface from room temperature to the Curie temperature (150° C.).

Then, an electric power was supplied to the GdFeCo alloy target and at a gas pressure of $4\times10^{-3}$ Torr, a second reproducing magnetic layer 3 made of $Gd_{0.31}(Fe_{0.80}Co_{0.20})_{0.69}$ was formed on the first in-plane magnetized layer 2 at a thickness of 15 nm. The second reproducing magnetic layer 3 had the characteristics of being in an in-plane magnetized state at room temperature and becoming a perpendicularly magnetized state at a temperature of 150° C., the compensation temperature thereof was 305° C., and the Curie temperature thereof was 315° C.

Then, a mixed gas of argon and nitrogen was introduced into the apparatus, an electric power was supplied to the Al target, and at a gas pressure of $4\times10^{-3}$ Torr, a non-magnetic intermediate layer 4 made of AlN was formed on the second reproducing magnetic layer 3 at a thickness of 2 nm.

Then, after evacuating the inside of the sputtering apparatus to $1\times10^{-6}$ Torr again, an argon gas was introduced into the apparatus, an electric power was supplied to the TbFeCo alloy target, and at a gas pressure of $4\times10^{-3}$ Torr, a recording magnetic layer 5 made of $Tb_{0.23}(Fe_{0.80}Co_{0.20})_{0.77}$ was formed on the non-magnetic intermediate layer 4 at a thickness of 50 nm. The recording magnetic layer 5 had a compensation temperature at 25° C. and the Curie temperature thereof was 275° C.

Then, a mixed gas of argon and nitrogen was introduced into the apparatus, an electric power was supplied to the Al target, and under the condition of a gas pressure of $4\times10^{-3}$ Torr, a protective layer 9 made of AlN was formed on the recording magnetic layer 5 at a thickness of 20 nm.

Finally, a ultraviolet curing resin was coated on the protective layer 9 by spin coating and the coated layer was irradiated with ultraviolet rays to form an overcoat layer 10.

Figure 3:
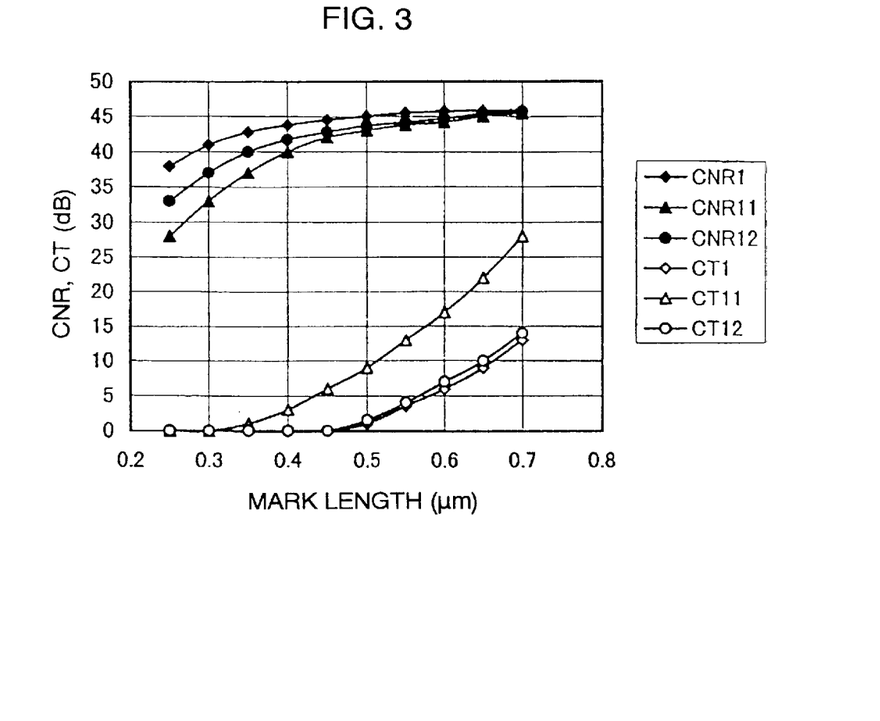
FIG. 3 is a view showing the reproduction characteristics of the magneto-optical disk of Example 1.

(2) Recording and reproducing characteristics:

The mark length reliance (CNR1) of CNR (signal to noise ratio) in a land recording region obtained by measuring the above-described magneto-optical disk by a magnetic field modulation recording system using an evaluation apparatus having photo pick up using a semiconductor laser having a wavelength of 680 nm, and a crosstalk signal amount (CT1) to be leaked into the land recording region when the recording is carried out by a mark length corresponding to the adjacent both group recording regions are shown in FIG. 3.

For comparison, a magneto-optical disk, wherein the second reproducing magnetic layer 3 was not formed and the thickness of the in-plane magnetized layer 2 was established to be 10 nm as that of Example 1, was prepared as Comparative Example 1, and the mark length reliance (CNR11) of the CNR and the crosstalk signal amount (CT11) thereof are shown in FIG. 3. Furthermore, as Comparative Example 2, a magneto-optical disk, wherein the second reproducing magnetic layer 3 was not formed and the thickness of the in-plane magnetized layer 2 was established to be 25 nm, same as the total thickness of the first in-plane magnetized layer 2 and the second reproducing magnetic layer 3 in Example 1, was prepared, and the mark length reliance (CNR12) of the CNR and the crosstalk signal amount (CT12) thereof are shown in the same figure.

In addition, the mark length reliance of CNR shown above shows the signal to noise ratio in the case of continuously forming the recording magnetic domain of the length corresponding to the mark length by the recording magnetic domain pitch of the length of twice the mark length.

As shown in FIG. 3, CNR1, CNR11, and CNR12 at the mark length of 0.3 μm are 41 dB, 33 dB, and 37 dB, respectively, and it can be seen that the CNR (CNR1) of Example 1 becomes large compared with those of Comparative Example 1 and Comparative Example 2. Also, CTI, CT11, and CT12 at a mark length of 0.7 μm are 13 dB, 28 dB, and 14 dB respectively and it can be seen that CT of Comparative Example 2 and Examples 1 becomes small compared with that of Comparative Example 1. In Comparative Example 1 (CNR11 and CT11), the reproducing signal amount is decreased by thinning of the reproducing magnetic layer, CNR in the short mark length is lowered by intermixing of the reproducing, signal from the recording magnetic layer caused by the reduction in the total film thickness of the reproducing magnetic layer and the in-plane magnetized layer, and also CT at the long mark length becomes considerably large. Also, in Comparative Example 2 (CNR12 and CT12), because the in-plane magnetized layer is formed to be thick, a remarkable increase in CT at a long mark length is not observed but because the reproducing signal amount is decreased by thinning of the recording magnetic layer, CNR in a short mark length is lowered.

On the other hand, in Example 1, because the light beam 6 transmitted through the first reproducing magnetic layer 1 and the first in-plane magnetized layer 2 is reflected at the second reproducing magnetic layer 3, even when each of the thickness of the first reproducing magnetic layer 1 and the second reproducing magnetic layer 3 is thin, a large reproducing signal amount can be obtained, and CNR1 at a short mark length becomes larger than CNR11 and CNR12. Also, because the total thicknesses of the first reproducing magnetic layer 1, the first in-plane magnetized layer 2, and the second reproducing magnetic layer 3 are formed to be thick, a considerable increase in CT at a long mark length is not observed and CT1 at a long mark length can be made smaller than CT11.

As stated above, by successively laminating the first reproducing magnetic layer 1, the first in-plane magnetized layer 2, and the second reproducing magnetic layer 3 in this order in the magneto-optical recording medium of Example 1, the reproduction resolving power is improved, the CNR at the short mark length can be enlarged, and also the crosstalk can be considerably reduced.

In addition, in the example, the results of using GdFeCo as the first reproducing magnetic layer 1 and the second reproducing magnetic layer 3 and GdFe as the first in-plane magnetized layer 2 were described in detail but the invention is not limited to the case and other magnetic materials satisfying the necessary magnetic characteristics can be used. For example, for the first reproducing magnetic layer 1 and the second reproducing magnetic layer 3, rare earth metal-transition metal alloys such as NdGdFeCo, GdTbFeCo, GdDyFeCo, etc. can be used as magnetic materials other than GdFeCo, and for the first in-plane magnetized layer 2, rare earth metal-transition metal alloys such as GdFeCo, NdFeCo, NdGdFeCo, etc. can be used as magnetic materials other than GdFe. Also, for the purpose of lowering the Curie temperatures of these rare earth metal-transition metal alloys, alloys further added with a non-magnetic metal can be used.

EXAMPLE 2

Example 2 of the invention is explained as follows based on the drawings. In the example, the case of applying the magneto-optical recording medium to a magneto-optical disk is explained. In addition, in the example, the explanations for the same portions as in Example 1 are omitted.

Figure 4:
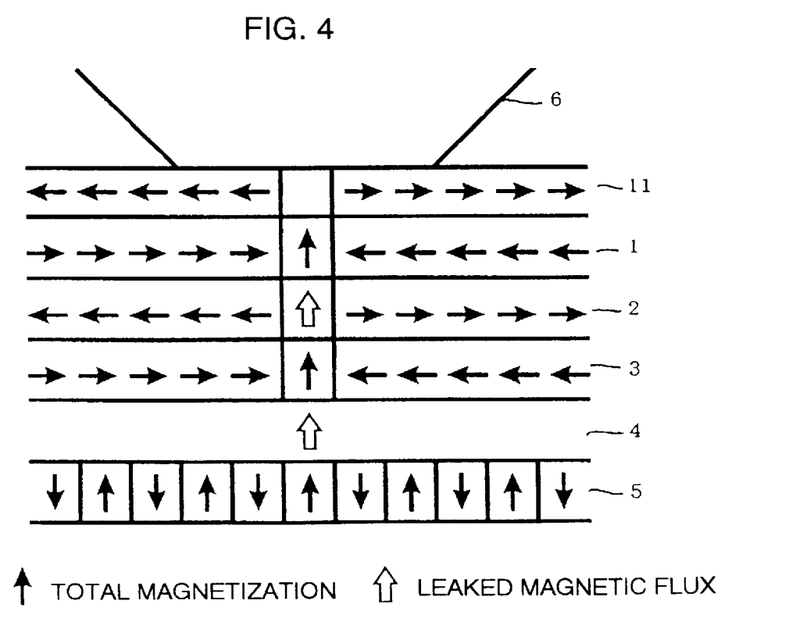
FIG. 4 is a schematic cross-sectional view explaining the reproduction principle of the magneto-optical disk of Example 2.

FIG. 4 is a schematic cross-sectional view explaining the reproduction performance principle of the super-resolving magneto-optical recording medium of Example 2. In the magneto-optical recording medium of Example 2, a second in-plane magnetized layer 11, a first reproducing magnetic layer 1, a first in-plane magnetized layer 2, a second reproducing magnetic layer 3, a non-magnetic intermediate layer 4, and a recording magnetic layer 5 are successively laminated. Each of the first reproducing magnetic layer 1, the first in-plane magnetized layer 2, and the second reproducing magnetic layer 3 is the same as the magnetic layer of Example 1, and fundamentally, by the same principle of Example 1, the magnetic super-resolving reproduction can be realized in Example 2.

In Example 2, the second in-plane magnetized layer 11 is formed at the light incident side of the first reproducing magnetic layer 1 and by the action of exchange-bonding from the first in-plane magnetized layer 2 and the second in-place magnetized layer 11 onto the first reproducing magnetic layer 1, a higher reproduction resolving power than Example 1 can be realized.

Figure 5:
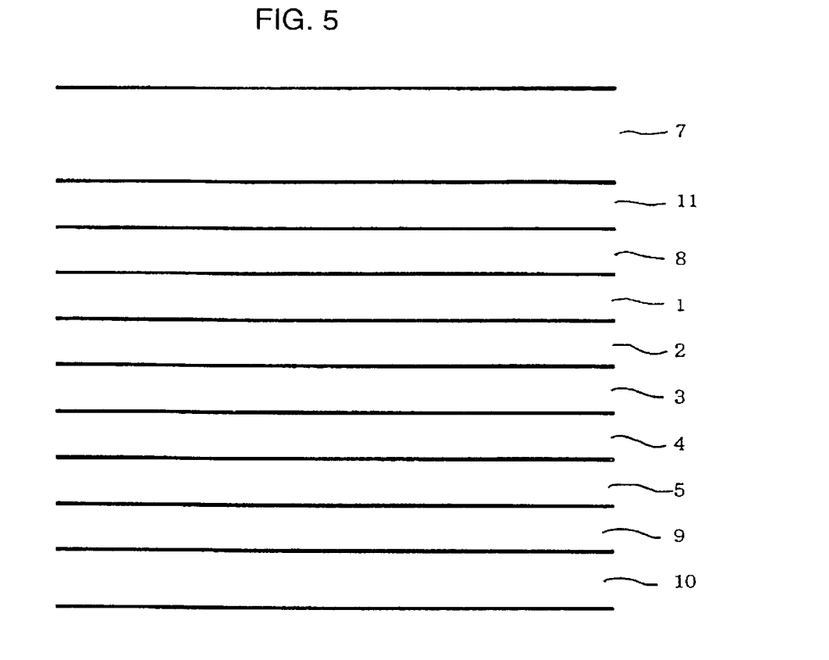
FIG. 5 is a cross-sectional view showing the construction of the magneto-optical disk of Example 2.

FIG. 5 is a schematic cross-sectional view showing the construction of the magneto-optical disk of Example 2. That is, in the magneto-optical recording medium of Example 2, a substrate 7, a transparent dielectric layer 8, a second in-plane magnetized layer 11, a first reproducing magnetic layer 1, a first in-plane magnetized layer 2, a second reproducing magnetic layer 3, a non-magnetic intermediate layer 4, a recording layer 5, a protective layer 9, and an overcoat layer 10 are successively laminated in this order.

Then, the formation method and the recording and reproducing characteristics of the magneto-optical disk are explained.

(1) Formation method of the magneto-optical disk:

The magneto-optical disk of Example 2 was formed by the same method of Example 1 except that in the formation method of the magneto-optical disk as d scribed in Example 1, before forming the first reproducing magnetic layer 1, the second in-plane magnetized layer 11 made of $Gd_{0.12}Fe_{0.88}$ was fed at a thickness of 4 nm using the same target as used for forming the first in-plane magnetized layer 2.

(2) Recording and Reproducing characteristics:

As a result of measuring CNR at the mark length of 0.3 μm in the same manner as in Example 1, while CNR in Example 1 was 41 dB, CNR in Example 2 was 42.5 dB and CNR at a short mark length became larger, and thus, it was confirm d that the improvement in the reproduction resolving power was realized in Example 2.

Then, the thickness of the second in-plane magnetized layer 11 is was further thickened an the same measurement as above was carried out. When the thickness f the second in-plane magnetized layer 11 was 10 nm, CNR at the mark length of 0.3 μm became 41.5 dB, which was higher than the CNR (41 dB) in Example 1, and thus, the effect of improving the reproduction resolving power by the second in-plane magnetized layer 11 was confirmed.

However, when the thickness of the second in-plane magnetized layer 11 was 12 nm, CNR at the mark length of 0.3 μm became 38.9 dB, which was lower than the CNR (41 dB) of Example 1. This was caused by that with an increase in e thickness of the second in-plane magnetized layer 11 which did not contribute to the reproduction output, the amount of light reaching the first reproducing magnetic layer 1 and the second reproducing magnetic layer 3 and reflected at the layers was reduced to lower the intensity of the reproduction signal, and thus it is necessary that the thickness of e second in-plane magnetized layer 11 is established to be not more than 10 nm.

Also, when the thickness of the second in-plane magnetized layer 11 was established to be 3 nm, CNR of Example 2 was 41.6 dB, which was higher than the CNR (41 dB) of Example 1 and thus the effect of improving the reproduction resolving power by the second in-plane magnetized layer 11 was confirmed.

However, when the thickness of the second in-plane magnetized layer 11 was established to be 2 nm, CNR of Example 2 became 39.9 dB, which was almost the same as the CNR (41 dB) of Example 1, and thus, in this case, the effect of improving the reproduction resolving power by the second in-plane magnetized layer 11 was not confirmed.

From the above descriptions, it has been found to be necessary that the thickness of the second in-plane magnetized layer 11 is from 3 nm to 10 nm.

EXAMPLE 3

Example 3 of the invention is explained as follows based on the drawings. In the example, the case of applying the magneto-optical recording medium to a magneto-optical disk is explained.

Figure 6:
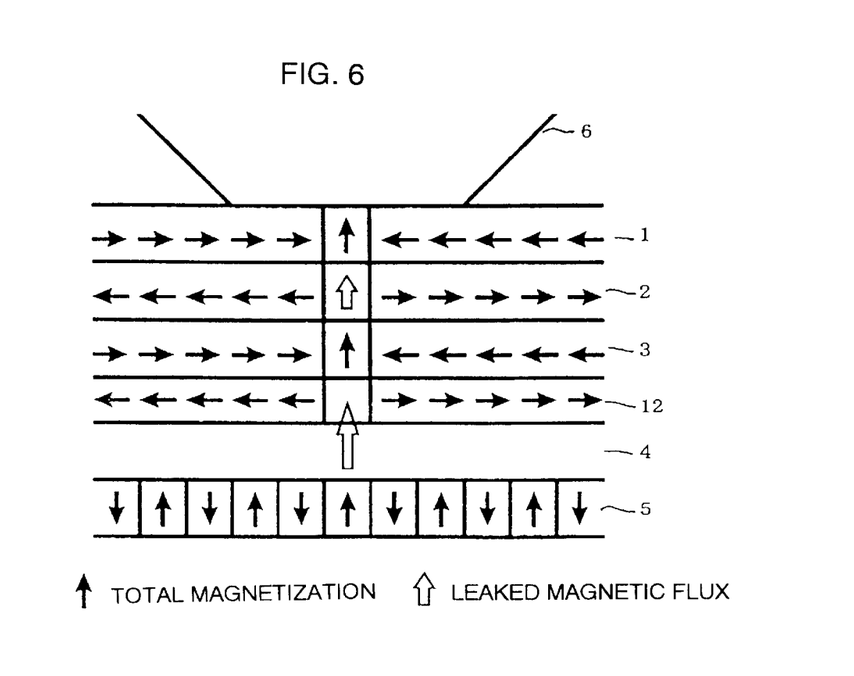
FIG. 6 is a schematic cross-sectional view explaining the reproduction principle of the magneto-optical disk of Example 3.

FIG. 6 is a schematic cross-sectional view explaining the reproducing performance principle of the super-resolving magneto-optical recording medium of Example 3.

In the magneto-optical recording medium of Example 3, a first reproducing magnetic layer 1, a first in-plane magnetized layer 2, a second reproducing magnetic layer 3, a third in-plane magnetized layer 12, a non-magnetic intermediate layer 4; and a recording magnetic layer 5 are successively laminated. Each of the first reproducing magnetic layer 1 and the first in plane magnetized layer 2 and the second reproducing magnetic layer 3 is the same as the magnetic layer of Example 1 and fundamentally, by the same principle as in Example 1, the magnetic super-resolving reproduction can be realized.

In Example 3, the third in-plane magnetized layer 12 is formed on the recording layer side of the second reproducing magnetic layer 3 of Example 1, and by the action of exchange-bonding from the first in-plane magnetized layer 2 and the third in-plane magnetized layer 12 onto the second reproducing magnetic layer 3, the in-plane magnetized mask of the second reproducing magnetic layer 3 is strengthened and a higher reproduction resolving power than in Example 1 can be realized.

Figure 7:
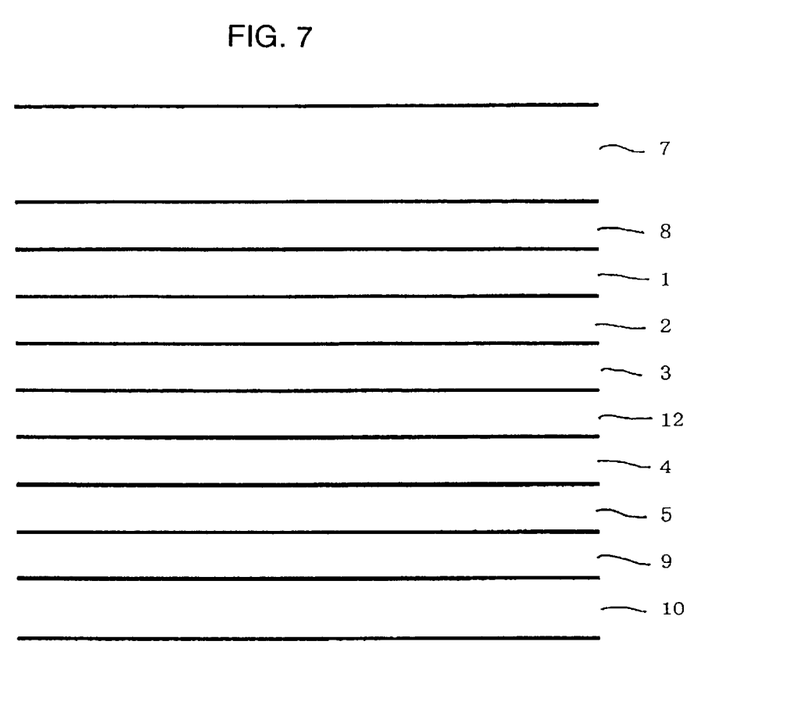
FIG. 7 is a cross-sectional view showing the construction of the magneto-optical disk of Example 3.

FIG. 7 is a schematic cross-sectional view showing the construction of the magneto-optical disk of Example 3. In the magneto-optical recording medium of Example 3, a substrate 7, a transparent dielectric layer 8, a first reproducing magnetic layer 1, a first in-plane magnetized layer 2, a second reproducing magnetic layer 3, a third in-plane magnetized layer 12, a non-magnetic intermediate layer 4, a recording layer 5, a protective layer 9, and an overcoat layer 10 are successively laminated in this order.

Then, the format method and the recording and generating characteristics of the magneto-optical disk are explained.

(1) Formation method of the magneto-optical disk:

The magneto-optic disk of Example 3 was formed by the same method of Example 1 except that in the formation method of the magneto-optical disk as described in Example 1, after forming the second reproducing magnetic layer 3, the third in-plane magnetized layer 12 made of $Gd_{0.12}Feo_{0.88}$ was formed at a thickness of 15 nm using the same target as used for forming the first in-plane magnetized layer 2.

(2) Recording and reproducing characteristics:

As a result of measuring CNR and CT at a mark length of 0.3 $\mu$m as in Example 1, while CNR in Example 1 was 41 dB, in Example 3, CNR was 42.2 dB, which became larger than Example 1 at the short mark length, and it was confirmed that in Example 3, the improvement of the reproduction resolving power was realized. Also, while CT of Example 1 at the mark length of 0.7 $\mu$m was 14 dB, the CT of Example 3 was 10.2 dB, and thus it was confirmed that by forming the third in-plane magnetized layer 12, the crosstalk was reduced.

It is necessary that the thickness of the third in-plane magnetized layer 12 is from 3 nm to 45 nm. When the thickness of the third in-plane magnetized layer 12 becomes less than 3 nm, the effect of strengthening the in-plane magnetized mask of the second reproducing magnetic layer 3 cannot be obtained and the improvement of the reproduction resolving power is not realized as the case of the second in-plane magnetized layer 11 of Example 2. Also, when the thickness of the third in-plane magnetized layer 12 becomes more than 45 nm, by increasing the distance between the recording magnetic layer 5 and the second reproducing magnetic layer 3, it becomes difficult to maintain a stable static magnetic bonding state.

Example 2 and Example 3 describe the case of forming the second in-plane magnetized layer 11 on the light incident side of the first reproducing magnetic layer 1 and the case of forming the third in-plane magnetized layer 12 on the recording layer side of the second reproducing magnetic layer 3, respectively, but in a super-resolving magneto-optical disk simultaneously using the second in-plane magnetized layer 11 and the third in-plane magnetized layer 12, and composed of the substrate 7, the transparent dielectric layer 8, the second in-plane magnetized layer 11, the first reproducing magnetic layer 1, the first in-plane magnetized layer 2, the second reproducing magnetic layer 3, the third in-plane magnetized layer 12, the non-magnetic intermediate layer 4, the recording layer 5, the protective layer 9, and the overcoat layer 10 successively laminated in this order, the same effect of improving the reproduction resolving power can be obtained.

In addition, in the embodiments of the invention (Examples 1 to 3) described above, only the case wherein the reproducing magnetic layers are two were described but the invention is not limited to the case but the reproducing magnetic layers may be a plurality of layers of two or more. However, it is necessary to dispose an in-plane magnetized layer between each of the reproducing magnetic layers. In this case, it is necessary that each in-plane magnetizer layer is established to have a sufficient thickness for transmitting a light beam at,reproduction.

Also, in the embodiments (Examples 1 to 3) described above, the critical temperature at which the reproducing magnetic layer shifts to a vertical magnetization was established, to be the temperature of almost the same as the Curie temperatures of the in-plane magnetized layers but the invention is not limited to the case. The critical temperature of the reproducing magnetic layer may be established to have a temperature of almost the same as the Curie temperature of the in-plane magnetized layer adjacent to at least one side of the thickness direction of the reproducing magnetic layer so that the reproduction resolving power can be improved by sharply shifting the reproducing magnetic layer to the perpendicularly magnetized state. As a matter of course, it is necessary that the thickness of each reproducing magnetic layer is established so that the in-plane magnetization can be maintained at a temperature of lower than the above-described critical temperature.

As described above, according to the magneto-optical recording medium of the present invention, the reproduction resolving power by thinning the reproducing magnetic layer can be improved and also lowering of the amount of the reflected light from the reproducing magnetic layer and lowering of the reproducing signal output accompanied by thinning of the thickness of each reproducing magnetic layer can be restrained.

By establishing the critical temperature of each of the reproducing magnetic layer to have a temperature of almost the same as the Curie

What is claimed is:

1. A magneto-optical recording medium comprising a recording magnetic layer made of a perpendicularly magnetized film and a multilayer reproducing film, wherein the multilayer reproducing film has two reproducing magnetic layers which are in a in-plane magnetized state at room temperature and shift to a perpendicularly magnetized state with a rise in temperature and an in-plane magnetized layer disposed between the two reproducing magnetic layers, which is in an in-plane magnetized state from room temperature to a Curie temperature and has a lower Curie temperature than the recording magnetic layer and the reproducing magnetic layers.

2. The magneto-optical recording medium according to claim 1 wherein the critical temperature of each reproducing magnetic layer for shifting to the perpendicularly magnetized state is established to be almost the same as the Curie temperature of the in-plane magnetized layer adjacent to at least one side of the film thickness direction.

3. The magneto-optical recording medium according to claim 1 wherein the thickness of each reproducing magnetic layer is from 10 nm to 35 nm.

4. The magneto-optical recording medium according to claim 1 wherein the in-plane magnetized layer disposed between the reproducing magnetic layers is established to have a thin thickness capable of transmitting a light beam for reproduction through the layer.

5. The magneto-optical recording medium according to claim 1 wherein the multilayer reproducing film comprises a first reproducing magnetic layer, a first in-plane magnetized layer and a second reproducing magnetic layer, and further a transparent dielectric layer, the first reproducing magnetic layer, the first in-plane magnetized layer, the second reproducing magnetic layer, a non-magnetic intermediate layer, the recording magnetic layer, and a protective layer are successively laminated on a transparent substrate.

6. The magneto-optical recording medium according to claim 1 wherein the multilayer reproducing film comprises a second in-plane magnetized layer, a first reproducing magnetic layer, a first in-plane magnetized layer, and a second reproducing magnetic layer, and further a transparent dielectric layer, the second in-plane magnetized layer the first reproducing magnetic layer, the first in-plane magnetized layer, the second reproducing magnetic layer, a non-magnetic intermediate layer, the recording magnetic layer and a protective layer are successively laminated on a transparent substrate.

7. The magneto-optical recording medium according to claim 6 wherein the thickness of the second in-plane magnetized layer is from 3 nm to 10 nm.

8. The magneto-optical recording medium according to claim 1 wherein the multilayer reproducing film comprises a first reproducing magnetic layer, a first in-plane magnetized layer, second reproducing magnetic layer, and a third in-plane magnetized layer, and further a transparent dielectric layer, the first reproducing magnetic layer, the first in-plane magnetized layer, the second reproducing magnetic layer, the third in-plane magnetized layer, a non-magnetic intermediate layer, the recording magnetic layer and a protective layer are successively laminated on a transparent substrate.

9. A magneto-optical recording medium comprising a recording magnetic layer made of a perpendicularly magnetized film and a multilayer reproducing film, wherein the multilayer reproducing film comprises at least two reproducing magnetic layers which are in an in-plane magnetized state at room temperature and shift to a perpendicularly magnetized state with a rise in temperature, and an in-plane magnetized layer having a lower Curie temperature than the recording magnetic layer and the reproducing magnetic layers, which is in an in-plane magnetized state from room temperature to the Curie temperature, the reproducing magnetic layers and the in-plane magnetized layer being alternately laminated.

10. The magneto-optical recording medium according to claim 9 wherein the critical temperature of each of the reproducing magnetic layers for shifting the magnetic layer to a perpendicularly magnetized state is established to be almost the same as the Curie temperature of the in-plane magnetized layer adjacent at least one side of the film thickness direction.

11. The magneto-optical recording medium according to claim 9 wherein the thickness of each of the reproducing magnetic layers is from 10 nm to 35 nm.

12. The magneto-optical recording medium according to claim 9 wherein the in-plane magnetized layer disposed between the reproducing magnetic layers is established to have a thin thickness capable of transmitting a light beam for reproduction through the layer.

13. A method of reproducing a magneto-optical recording medium, wherein the magneto-optical recording medium comprises a recording magnetic layer made of a perpendicularly magnetized film and a multilayer reproducing film, the method comprising the steps:

irradiating said multilayer reproducing film using light that is incident from an opposite side to a side on which the recording magnetic layer is disposed, wherein said light is reflected from a first reproducing magnetic layer disposed nearest a light incident side and said light transmitted through said first reproducing magnetic layer is incident upon second reproducing magnetic layer and reflected by the second reproducing magnetic layer; and reproducing data from said recording magnetic layer using not only said reflected light from the first reproducing magnetic layer but also the reflected light of the second reproducing magnetic layer.

* * * * *